US012664765B2

(12) United States Patent
Portnoy et al.

(10) Patent No.: US 12,664,765 B2
(45) Date of Patent: Jun. 23, 2026

(54) SYSTEM AND METHOD OF NEURAL RADIANCE FIELDS-BASED AUGMENTATION FOR ROBUST DETECTION

(71) Applicant: GM Global Technology Operations LLC, Detroit, MI (US)

(72) Inventors: Doron Portnoy, Kfar Yona (IL); Elran Gamzo, Shoham (IL)

(73) Assignee: GM Global Technology Operations LLC, Detroit, MI (US)

( * ) Notice: Subject to any disclaimer, the term of this patent is extended or adjusted under 35 U.S.C. 154(b) by 116 days.

(21) Appl. No.: 18/670,949

(22) Filed: May 22, 2024

(65) Prior Publication Data

US 2025/0363781 A1 Nov. 27, 2025

(51) Int. Cl.
G06V 10/774 (2022.01)
G06V 10/776 (2022.01)
G06V 20/56 (2022.01)

(52) U.S. Cl.
CPC .......... G06V 10/774 (2022.01); G06V 10/776 (2022.01); G06V 20/56 (2022.01)

(58) Field of Classification Search
CPC ..... G06V 10/774; G06V 10/776; G06V 20/56
See application file for complete search history.

(56) References Cited

U.S. PATENT DOCUMENTS

| | | | |
|---|---|---|---|
| 2024/0312123 A1* | 9/2024 | Anwar | G06T 19/006 |
| 2025/0265823 A1* | 8/2025 | Schreiber | G06V 10/44 |

OTHER PUBLICATIONS

Yan, Guohang [et al.]: OASim: an open and adaptive simulator based on neural rendering for autonomous driving. Preprint. [v1] Tue, Feb. 6, 2024 09: 19:44 UTC. Feb. 6, 2024. 10 S. https://arxiv.org/abs/2402.03830v1 [abgerufen am Mar. 27, 2026].

* cited by examiner

*Primary Examiner* — Navid Z. Mehdizadeh
*Assistant Examiner* — Oliver Tan
(74) *Attorney, Agent, or Firm* — Honigman LLP; Matthew H. Szalach; Jonathan P. O'Brien

(57) ABSTRACT

A computer-implemented method that, when executed by data processing hardware, causes the data processing hardware to perform operations comprising gathering sensor data from one or more sensors of a host vehicle, training a neural radiance fields (NeRF) network with the sensor data, selecting a vehicle configuration, developing a scene augmentation based on the vehicle configuration, generating a dataset based on the scene augmentation, and either (i) training a perception module with one or more perception detection tasks based on the dataset or (ii) evaluating a sensor configuration based on the dataset.

18 Claims, 4 Drawing Sheets

400

START 410

Gathering sensor data 420

Training neural radiance field network 430

Selecting a vehicle configuration 440

Developing a scene augmentation 450

Generating a dataset 460

Training a perception module with one or more perception detection tasks 470

END 480

SYSTEM AND METHOD OF NEURAL RADIANCE FIELDS-BASED AUGMENTATION FOR ROBUST DETECTION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a perception system of a vehicle and, more particularly, a method of generating a universal model for training perception systems of vehicles with varying sensor configurations.

In general, a vehicle can be equipped with various sensors that are configured to gather sensor data concerning an environment surrounding the vehicle. The sensor data can be evaluated by a perception system that includes one or more perception detectors. The perception detectors can be trained with annotated data to identify one or more objects in the environment. Typically, however, perception detectors are required to operate on multiple vehicles that have varying sensor configurations which can be challenging as the perception detectors are commonly only sensitive to a specific sensor configuration. Collecting the necessary amount of data to properly train perception detectors based on a given vehicle configuration is time consuming. Shortcomings of existing systems and methods are addressed by one or more aspects of the present disclosure.

SUMMARY

In one configuration, a computer-implemented method that, when executed by data processing hardware, causes the data processing hardware to perform operations is provided. The operations include gathering sensor data from one or more sensors of a host vehicle, training a neural radiance fields (NeRF) network with the sensor data, selecting a vehicle configuration, developing a scene augmentation based on the vehicle configuration, generating a dataset based on the scene augmentation, and at least one of (i) training a perception module with one or more perception detection tasks based on the dataset or (ii) evaluating a sensor configuration based on the dataset.

The method may include one or more of the following optional aspects or steps. For example, the sensor data can further include data received from one or more cameras and at least one navigation system. The sensor data can further include images of an environment surrounding the host vehicle and positional data of the host vehicle. Training the NeRF network can further include reconstructing a scene of the environment surrounding the host vehicle.

According to at least one aspect, the vehicle configuration can further include a host vehicle configuration. The vehicle configuration can further include a randomized vehicle configuration. The host vehicle configuration and the randomized vehicle configuration can further include a position and an orientation of the one or more sensors. The vehicle configuration can further include a vehicle route configuration.

According to another aspect, training the perception module can further include training a detector module, a tracking module, and a predictive module of the perception module.

According to at least one example, evaluating the sensor configuration can further include validating the sensor configuration based on the dataset.

In another configuration, a system is provided and includes data processing hardware and memory hardware in communication with the data processing hardware, the memory hardware storing instructions that, when executed on the data processing hardware, cause the data processing hardware to perform operations. The operations include gathering sensor data from one or more sensors of a host vehicle, determining a pose of the host vehicle with respect to a vehicle environment, training a neural radiance fields (NeRF) network with the sensor data, selecting a vehicle configuration, developing a scene augmentation based on the vehicle configuration, generating a dataset based on the scene augmentation, and at least one of (i) training a perception module with one or more perception detection tasks based on the dataset or (ii) evaluating a sensor configuration based on the dataset.

The system may include one or more of the following optional aspects or steps. For example, the sensor data can further include data received from one or more cameras and at least one navigation system. The sensor data can further include images of an environment surrounding the host vehicle and positional data of the host vehicle. Training the NeRF network can further include reconstructing a scene of the environment surrounding the host vehicle.

According to at least one aspect, the vehicle configuration can further include a host vehicle configuration. The vehicle configuration can further include a randomized vehicle configuration. The host vehicle configuration and the randomized vehicle configuration can further include a position and an orientation of the one or more sensors. The vehicle configuration can further include a vehicle route configuration.

According to another aspect, training the perception module can further include training a detector module, a tracking module, and a predictive module of the perception module.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
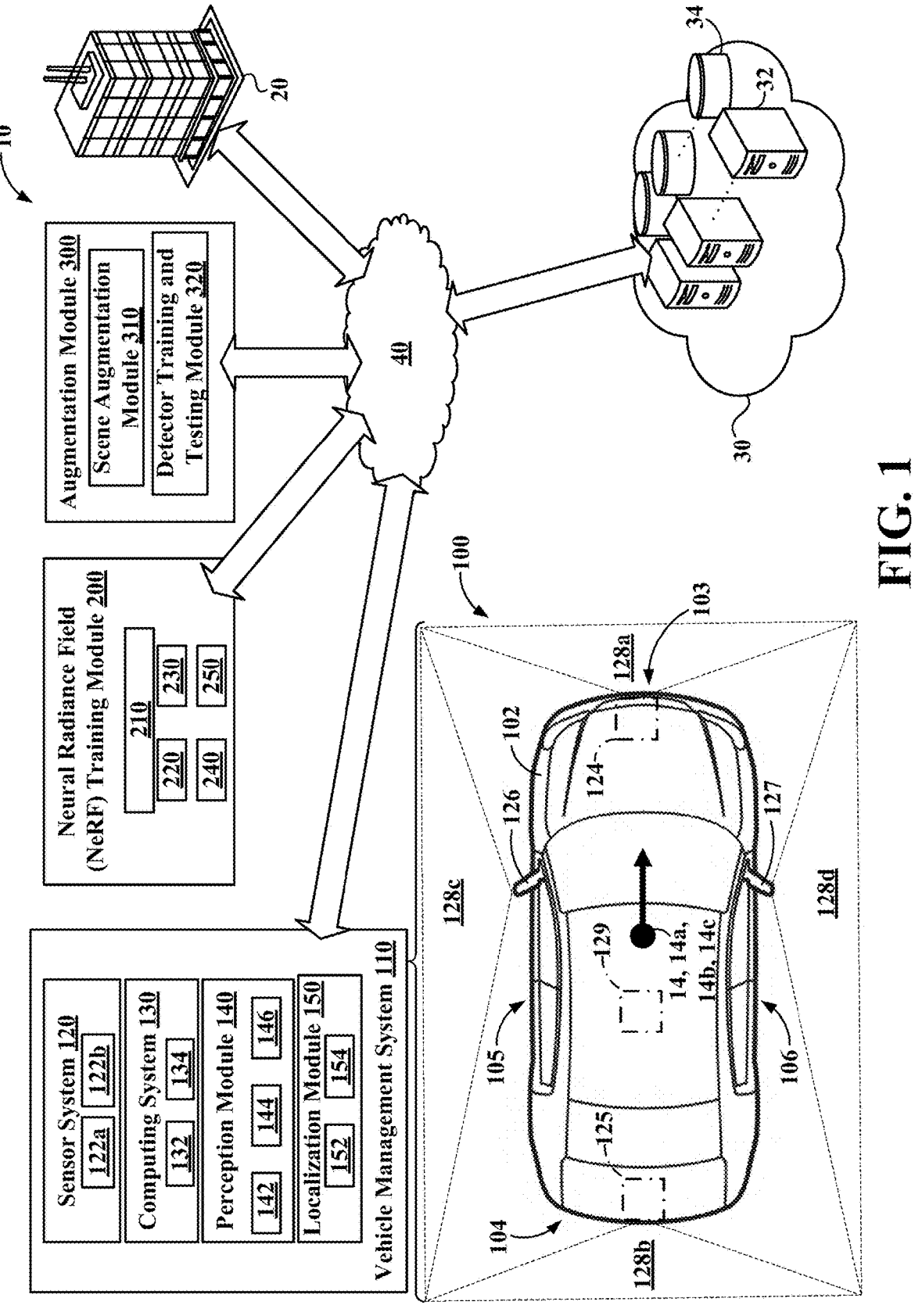
FIG. 1 is a schematic diagram of a vehicle environment including a vehicle management system according to the principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Referring to FIG. 1, an example vehicle operating environment 10 is provided for illustration of the principles of the present disclosure. The vehicle operating environment 10 includes a vehicle service center 20. For the sake of illustration, the vehicle operating environment 10 is shown as including a single vehicle service center 20. However, in other examples, the vehicle operating environment 10 may include a plurality of vehicle service centers 20 in communication over a network 40 (e.g., the Internet, cellular networks).

The vehicle operating environment 10 includes a host vehicle 100 having a vehicle body 102. The vehicle body 102 includes a first or front end 103 and a second or rear end 104 spaced from and opposite the front end 103. Additionally, the vehicle body 102 includes a first or driver side 105 and a second or passenger side 106 spaced from and opposite the driver side 105. In another configuration, depending on the particular region of the world where the host vehicle 100 is manufactured, the driver side 105 and the passenger side 106 may be on opposite sides of the host vehicle 100. The present disclosure applies to vehicles driven on either side of a vehicle such as the host vehicle 100. Additionally, the present disclosure can be implemented for partially autonomous and/or fully autonomous vehicles.

The host vehicle 100 includes a vehicle management system 110 comprising a sensor system 120, a computing system 130, a perception module 140, and a localization module 150. As discussed in more detail below, the vehicle management system 110 can be configured to communicate with (i.e., send data to and receive data from) back office modules, such as a neural radiance fields (NeRF) training module 200 and/or an augmentation module 300. The vehicle management system 110 may be configured to gather information concerning the environment 10 surrounding the host vehicle 100 for training and/or testing one or more perception detectors of the host vehicle 100 having a first sensor configuration or of another vehicle that has a sensor configuration other than the first sensor configuration.

While the host vehicle 100 maneuvers about the environment 10, the sensor system 120 includes various sensor subsystems 122, 122a, 122b configured to gather sensor data 123, 123a, 123b (FIG. 2) relating to characteristics of the environment 10, a status of the host vehicle 100, or a position (i.e., pose) of the host vehicle 100. The sensor subsystems 122 can include an exterior sensor subsystem 122a configured to measure and/or obtain external environmental data 123a, such as surrounding objects (e.g., vehicles, pedestrians, parking lines, etc.). The exterior sensor subsystem 122a can include one or more of a camera, infrared camera, thermal camera, lidar system, radar system, ultrasonic sensor, ground-penetrating radar (GPR), etc. With reference to FIG. 1, the exterior sensor subsystem 122a can include a first or front sensor 124, a second or rear sensor 125, a third or driver side sensor 126, and a fourth or passenger side sensor 127. The sensors 124, 125, 126, 127 include a range 128 that captures the environment 10 surrounding the host vehicle 100. For instance, the range 128 of the sensors 124, 125, 126, 127 can provide 360 degree sensor coverage surrounding the host vehicle 100. In the present example, the range 128 includes a first or front region 128a, a second or rear region 128b, a third or driver side region 128c, and a fourth or passenger side region 128d. Note, in FIG. 1, the dotted triangles are merely one example of many possible sensor ranges 128 for the sensors 124, 125, 126, 127. As will be discussed below, some sensors selected for the third and fourth sensors 126, 127 are configured with a range 128c, 128d that can capture portions of the front end 103 and the rear end 104 of the host vehicle 100.

The sensor subsystems 122 can include a positional sensor subsystem 122b configured to measure and/or obtain positional data 123b of the host vehicle 100 while the host vehicle 100 is at rest and while the host vehicle 100 is traveling. The positional sensor subsystem 122b can include at least one positional sensor 129, such as one or more of a global navigation satellite system (GNSS) and/or one or more global positioning system (GPS) sensors. The positional sensor subsystem 122b can also be equipped with one or more sensors for vehicle-to-vehicle (V2V) communication, vehicle-to-infrastructure (V2I) communication, and/or vehicle-to-everything (V2X) communication.

As the sensor system 120 gathers the sensor data 123, a computing system 130 is configured to store, process, and/or communicate the sensor data 123 within the vehicle operating environment 10. In order to perform computing tasks related to the sensor data 123, the computing system 130 of the host vehicle 100 includes data processing hardware 132 and memory hardware 134. The data processing hardware 132 is configured to execute instructions stored in the memory hardware 134 to perform computing tasks related to operation and management of the host vehicle 100. Generally speaking, the computing system 130 refers to one or more locations of data processing hardware 132 and/or memory hardware 134.

In some examples, the computing system 130 is a local system located on the host vehicle 100. When located on the host vehicle 100, the computing system 130 may be centralized (i.e., in a single location/area on the host vehicle 100), decentralized (i.e., located at various locations about the host vehicle 100), or a hybrid combination of both (e.g., with a majority of centralized hardware and a minority of decentralized hardware). To illustrate some differences, a decentralized computing system 130 may allow processing to occur at an activity location while a centralized computing system 130 may allow for a central processing hub that communicates to systems located at various positions on the host vehicle 100.

Additionally or alternatively, the computing system 130 includes computing resources that are located remotely from the host vehicle 100. For instance, the computing system 130 may communicate via the network 40 with a remote vehicle computing system 30 (e.g., a remote computer/server or a cloud-based environment). Much like the computing system 130, the remote vehicle computing system 30 includes remote computing resources such as remote data processing hardware 32 and remote memory hardware 34. Here, sensor data 123 or other processed data (e.g., data processing locally by the computing system 130) may be stored in the remote vehicle computing system 30 and may be accessible to the computing system 130. In some examples, the computing system 130 is configured to utilize the remote resources 32, 34 as extensions of the computing resources 132, 134 such that resources of the computing system 130 may reside on resources of the remote vehicle computing system 30.

With continued reference to FIG. 1, the perception module 140 and the localization module 150 can be configured to be processed with or carried out by the computing system 130 or remote vehicle computing system 30. The perception module 140 and the localization module 150 may be desirable for modeling the environment 10 with respect to a pose 14 of the vehicle 12. The positional sensor 129 can provide the pose 14 of the vehicle which may include a first or x-coordinate 14a, a second or y-coordinate 14b, and a third or z-coordinate 14c. The perception module 140 can be configured to collect and evaluate sensor data 123 and extract relevant knowledge from the environment 10. The localization module 150 can be configured to determine the pose 14 of the vehicle 12 with respect to the environment 10.

The perception module 140 can include one or more perception detectors that are a configured to be trained with one or more datasets. For example, the perception detectors can include a detection module 142, a tracking module 144, and a predictive module 146. The detection module 142 can be configured to determine objects such as pedestrians, vehicles, and traffic signs in the vicinity of the host vehicle 100. The tracking module 144 can be configured to track motion of the objects detected by the detection module 142 with respect to time. The predictive module 146 can be configured to predict motion of the objects detected by the detection module 142 with respect to time.

The localization module 150 can include one or more sub-modules such as a simultaneous localization and mapping (SLAM) module 152 and a vehicle position module 154. The SLAM module 152 can be configured to construct and update a map of the environment 10 while simultaneously tracking the pose 14 of the host vehicle 100 within the environment 10. The vehicle position module 154 can be configured to continuously receive the positional data 123b from the positional sensor subsystem 122b and provide the data to the SLAM module 152 or any of the perception detectors of the perception module 140, for example.

In general, vehicle perception modules require a large amount of annotated data in order to quickly and accurately detect objects in the environment 10. Different vehicles (i.e., type, make, model, etc.) have different sensor configurations (i.e., height, lateral position, orientation, etc.) and each respective perception module has to be trained on (i.e., is only sensitive to) data associated with the sensor configuration for a given vehicle. Heretofore, training a perception module with requisite data is costly and time consuming.

Figure 2:
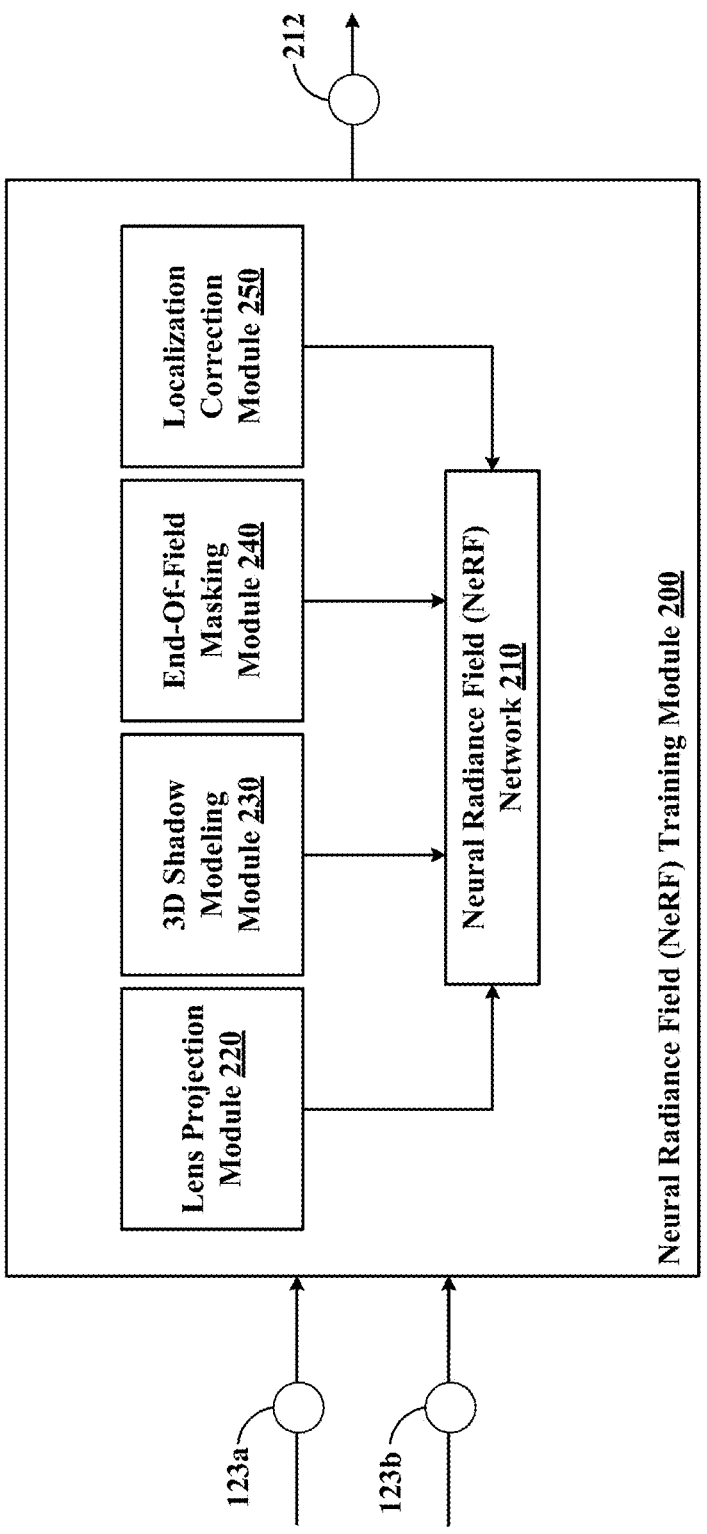
FIG. 2 is an enlarged schematic diagram showing an example of a neural radiance fields (NeRF) training module of the vehicle management system of FIG. 1.

With reference to FIG. 2, the NeRF training module 200 can be configured to collect and modify data concerning the environment 10 surrounding the host vehicle 100 and provide a scene model 212 that can be used to train the perception detectors of the perception module 140 of the host vehicle 100, as well as perception detectors of vehicles that have different sensor configurations. More specifically, the NeRF training module 200 can include a neural radiance (NeRF) network 210 which can be configured to receive a single continuous 6D coordinate (spatial location (x, y, z) and viewing direction (θ, φ, γ)) as an input and provide a volume density and view-dependent emitted radiance at that spatial location as an output. The NeRF training module 200 can be equipped with one or more modules that may be used to modify and/or improve the data 123 received from the sensor subsystems 122 to enhance the scene model 212.

For example, the NeRF training module 200 can include a lens projection module 220 which is configured to receive images from cameras that have different style lenses and evaluate the data accordingly. According to at least one aspect, the lens projection module 200 can be configured to receive data 123a captured with a fisheye lens that has a cylindrical projection and prepare the data 123a for evaluation by the NeRF network 210.

According to another aspect, the NeRF training module 200 can include a 3D shadow modeling module 230 that can be configured to eliminate shadows from data 123a received from the exterior sensor subsystem 122a. Depending on the position of the sun, a portion of the host vehicle 100 can block some of the light and project a shadow on a portion of the environment 10 surrounding the host vehicle 100, for example. In general, the NeRF network 210 is configured to assess static data 123a (e.g., images of the environment 10 surrounding the host vehicle 100), however, shadows resulting from the host vehicle 100 typically change while the host vehicle 100 is traveling. The changing shadow can cause a dynamic effect that can degrade the scene model 212.

Accordingly, the 3D shadow modeling module can modify the data 123a and remove the shadow or dynamic aspect to enhance the scene model 212.

Additionally or alternatively, the NeRF training module 200 can include an end-of-field (EOF) masking module 240 which can be configured to remove artifacts from data 123a received from the exterior sensor subsystem 122a. In one example, one or more artifacts can arise when a wide angled lens or fisheye lens captures a portion of the front end 103 or rear end 104 of the host vehicle 100. The EOF masking module 240 can mask and/or eliminate a portion of the data 123a that includes one or more of these artifacts, for example. In other words, the EOF masking module 240 can be configured to remove one or more artifacts arranged at an outer or end region of images.

According to another aspect, the NeRF training module 200 can include a localization correction module 250 that can be configured to utilize a calibration and relative position of one or more sensors and adjust the navigation system of the host vehicle 100 accordingly.

Figure 3:
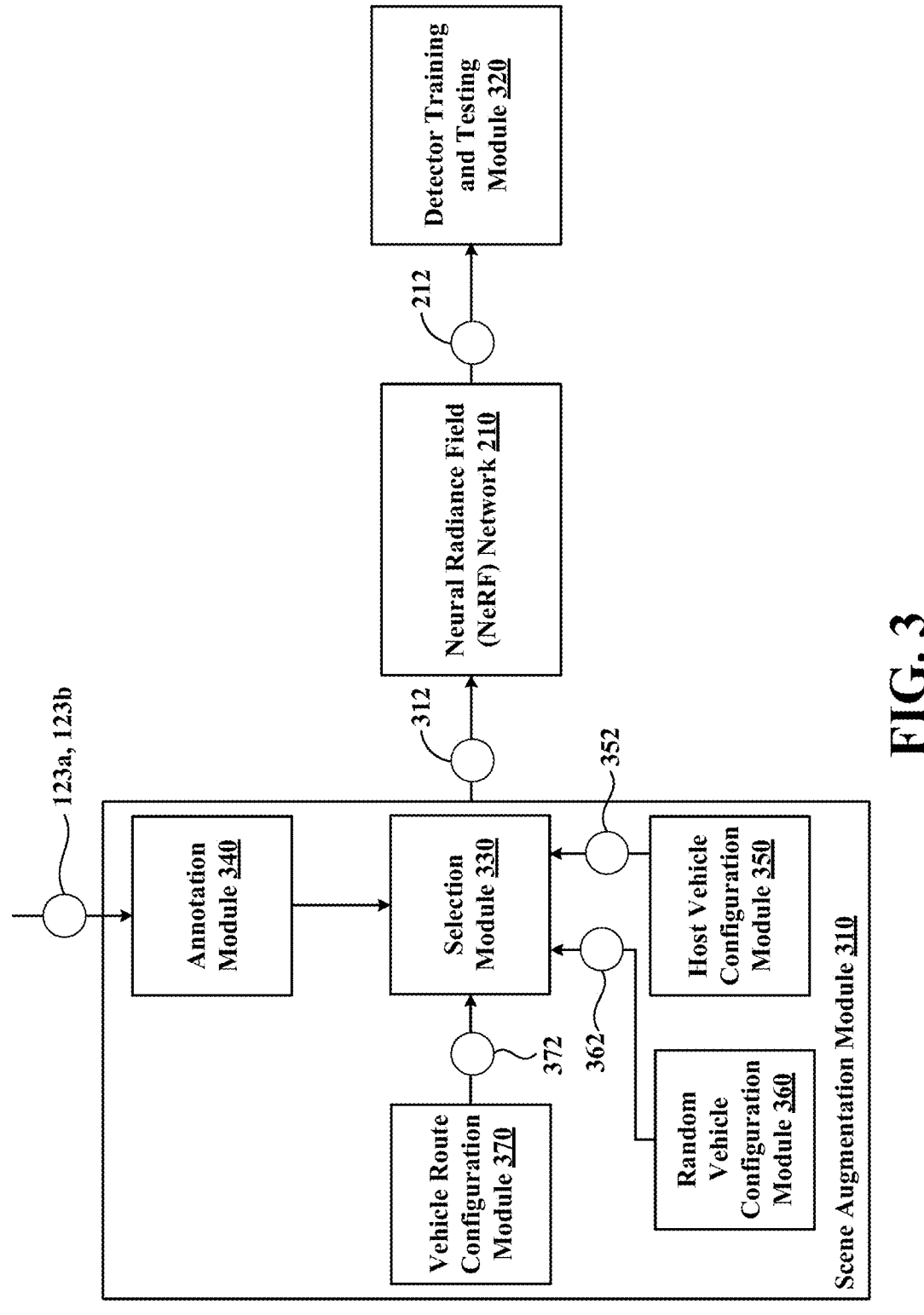
FIG. 3 is a schematic diagram of a NeRF network, a scene augmentation module, and a detector training and testing module according to principles of the present disclosure.

After the NeRF network 210 is trained, it can be configured to infer the scene model 212. For instance, with reference to FIG. 3, the scene augmentation module 310 of the augmentation module 300 (FIG. 1) can be configured to provide the NeRF network 210 with a randomized configuration 312 so that the scene model 212 can be generated (i.e., inferred) accordingly. The scene augmentation module 310 can include one or more modules for generating the randomized configuration 312, such as a selection module 330, an annotation module 340, a host vehicle configuration module 350, a random vehicle configuration module 360, and a vehicle route configuration module 370.

The selection module 330 can be configured to receive annotated data 123a, 123b from the annotation module 340, as well as a host vehicle configuration 352 from the host vehicle configuration module 350, one or more randomized vehicle configurations 362 from the random vehicle configuration module 360, and/or one or more driving route configurations 372 of the vehicle route configuration module 370.

The annotation module 340 can be configured to receive the annotated data 123 from the sensor subsystems 122 and selectively provide the annotated data 123 to the selection module 330.

The host vehicle configuration module 350 can be configured with the first sensor configuration of the host vehicle 100. The first sensor configuration 352 can include one or more of a height, a lateral position, a pitch, a roll, and/or a yaw for each of the sensors 124, 125, 126, 127 of the host vehicle 100. Note, the host vehicle configuration module 350 can be configured to modify or alter the first sensor configuration 352 in order for the NeRF network 210 to generate the scene model 212. This can be desirable to ensure that the scene model is robust.

The random vehicle configuration module 360 can be configured to generate the randomized vehicle configuration 362 which includes the same degrees of freedom presented in another (i.e., prior or related) configuration.

The vehicle route configuration module 370 can be configured to provide a driving route configuration 372 to the selection module 330 so that a scene can be augmented accordingly. This may be desirable to account for various routes the host vehicle 100 can take with respect to objects in the environment 10. For instance, if the host vehicle 100 is driving in a parking lot with one or more parking slots the vehicle route configuration module 370 can be configured to provide the driving route configuration 372 that accounts for the host vehicle 100 entering one or more of the one or more parking slots. Augmenting the scene in this manner can help ensure that scene model is robust.

Figure 4:
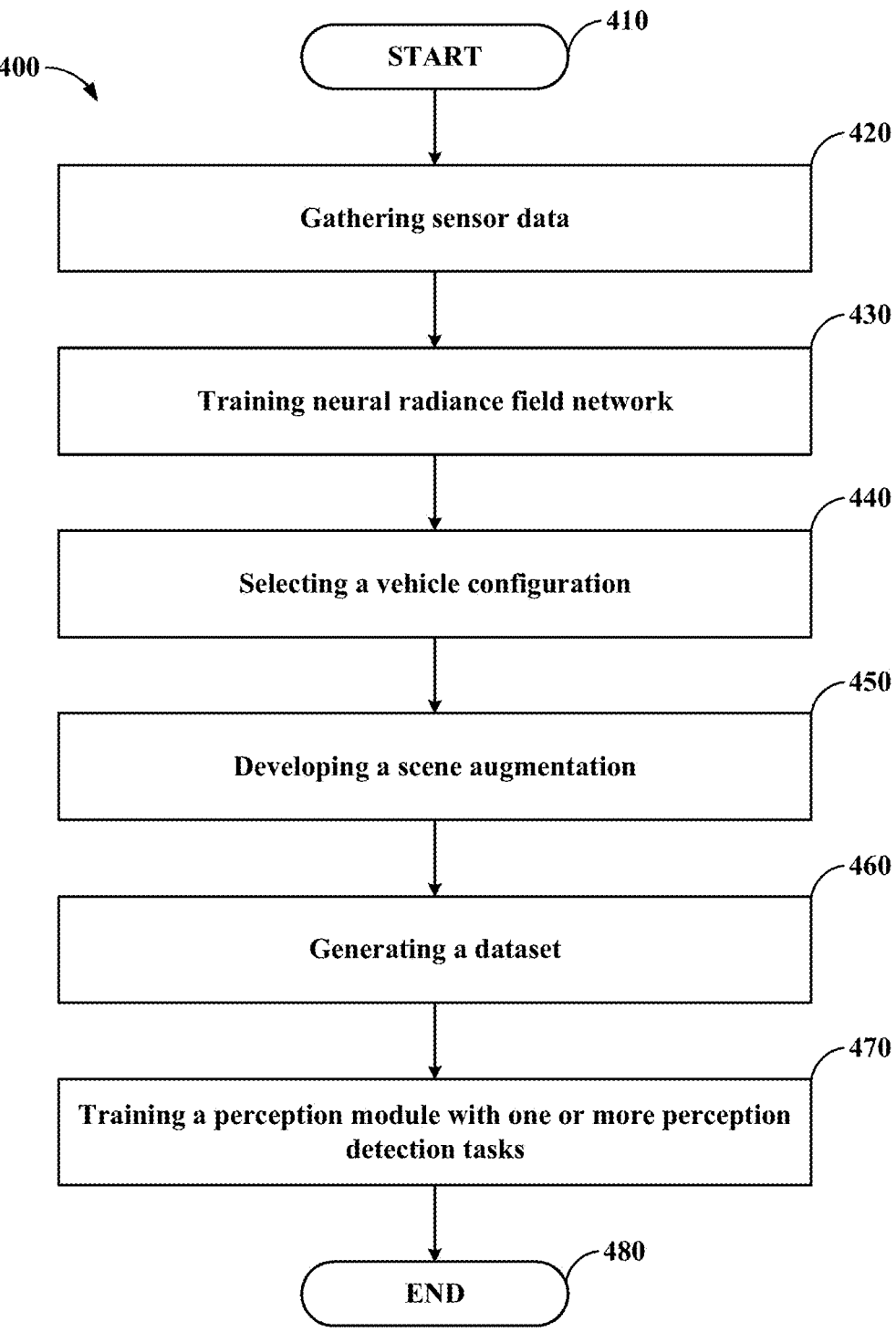
FIG. 4 is a flow diagram showing operations of the NeRF training module and the augmentation module according to principles of the present disclosure.

With reference to FIG. 4, a method 400 is provided for reconstructing and augmenting a scene of the environment 10 surrounding the host vehicle 100. The method 400 is initiated at 410. In practical terms, the method can be initiated when an operator of the vehicle turns on an ignition of the host vehicle 100.

At 420, the sensor data 123a, 123b can be gathered with the sensor subsystems 122a, 122b of the sensor system 120.

At 430, the NeRF network 210 can be trained with the sensor data 123a, 123b. Additionally, the sensor data 123a, 123b can be evaluated and/or corrected via the lens projection module 220, the 3D shadow modeling module 230, the EOF masking module 240, and/or the localization correction module 250 before training the NeRF network 210.

At 440, the selection module 330 of the scene augmentation module 310 can generate the randomized configuration 312 based at least in part on the host vehicle configuration 352 from the host vehicle configuration module 350, the randomized vehicle configuration 362 from the random vehicle configuration module 360, and the driving route configuration 372 from the vehicle route configuration module 370.

At 450, the NeRF network 210 can receive the randomized configuration 312 and generate the scene model 212 accordingly.

At 460, a dataset can be generated based on the scene model 212.

At 470, one or more detectors of the perception module 140 can be trained based on the dataset concerning the scene model 212. Additionally or alternatively, the dataset can be used to test and/or validate various sensor configurations to determine an optimal configuration (i.e., position and orientation) of one or more sensors for a vehicle.

At 480, the method 400 ends.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A computer-implemented method that, when executed by data processing hardware, causes the data processing hardware to perform operations comprising:

gathering sensor data from one or more sensors of a host vehicle;

training a neural radiance fields (NeRF) network with the sensor data;

selecting a randomized vehicle configuration;

developing a scene augmentation based on the randomized vehicle configuration, the scene augmentation including masking and shadow elimination;

generating a dataset based on the scene augmentation; and at least one of (i) training a perception module with one or more perception detection tasks based on the dataset and (ii) evaluating a sensor configuration based on the dataset.

2. The method of claim 1, wherein the sensor data further comprises data received from one or more cameras and at least one navigation system.

3. The method of claim 2, wherein the sensor data further comprises images of an environment surrounding the host vehicle and positional data of the host vehicle.

4. The method of claim 3, wherein training the NeRF network further comprises reconstructing a scene of the environment surrounding the host vehicle.

5. The method of claim 1, wherein developing the scene augmentation is further based on a host vehicle configuration.

6. The method of claim 5, wherein the host vehicle configuration and the randomized vehicle configuration further comprise a position and an orientation of the one or more sensors.

7. The method of claim 6, wherein developing the scene augmentation is further based on a vehicle route configuration.

8. The method of claim 1, wherein training the perception module further comprises training a detector module, a tracking module, and a predictive module of the perception module.

9. The method of claim 1, wherein evaluating the sensor configuration further comprises validating the sensor configuration based on the dataset.

10. A system comprising:
data processing hardware; and
memory hardware in communication with the data processing hardware, the memory hardware storing instructions that, when executed on the data processing hardware, cause the data processing hardware to perform operations comprising:
gathering sensor data from one or more sensors of a host vehicle;

determining a pose of the host vehicle with respect to a vehicle environment;
training a neural radiance fields (NeRF) network with the sensor data;
selecting a randomized vehicle configuration;
developing a scene augmentation based on the randomized vehicle configuration, the scene augmentation including masking and shadow elimination;
generating a dataset based on the scene augmentation; and
at least one of (i) training a perception module with one or more perception detection tasks based on the dataset and (ii) evaluating a sensor configuration based on the dataset.

11. The system of claim 10, wherein the sensor data further comprises data received from one or more cameras and at least one navigation system.

12. The system of claim 11, wherein the sensor data further comprises images of an environment surrounding the host vehicle and positional data of the host vehicle.

13. The system of claim 12, wherein training the NeRF network further comprises reconstructing a scene of the environment surrounding the host vehicle.

14. The system of claim 10, wherein developing the scene augmentation is further based on a host vehicle configuration.

15. The system of claim 14, wherein the host vehicle configuration and the randomized vehicle configuration further comprise a position and an orientation of the one or more sensors.

16. The system of claim 15, wherein developing the scene augmentation is further based on a vehicle route configuration.

17. The system of claim 10, wherein training the perception module further comprises training a detector module, a tracking module, and a predictive module of the perception module.

18. The system of claim 10, wherein evaluating the sensor configuration further comprises validating the sensor configuration based on the dataset.

* * * * *